Dec. 25, 1956 P. R. HOFFMAN 2,775,300

TAPE PUNCHING APPARATUS

Filed Sept. 21, 1955 3-Sheets-Sheet 1

*INVENTOR.*
PAUL R. HOFFMAN

*BY* William R. Nolte

AGENT

Dec. 25, 1956

P. R. HOFFMAN 2,775,300

TAPE PUNCHING APPARATUS

Filed Sept. 21, 1955

3 Sheets-Sheet 2

INVENTOR.
PAUL R. HOFFMAN

BY
William R. Nolte
AGENT

INVENTOR.
PAUL R. HOFFMAN
BY William R. Nolte
AGENT

United States Patent Office 2,775,300

Patented Dec. 25, 1956

2,775,300

TAPE PUNCHING APPARATUS

Paul R. Hoffman, Woodlyn, Pa., assignor to Burroughs Corporation, Detroit, Mich., a corporation of Michigan Application September 21, 1955, Serial No. 535,559

10 Claims. (Cl. 164—115)

This invention relates to high speed tape punching apparatus adapted to record in punched tape, data from high speed systems such as business machines, computers, calculators and telegraph systems.

For some time it has been sought to obtain a simplified tape punch in an effort to reduce manufacturing costs but at the same time provide a punch with a higher speed of operation. Many tape punching machines in common use the present time frequently embody complicated cam elements and linkages to position punch interposers into operative punching position. These punch interposers coact with the punch elements to perforate the tape. In this type of device spring means urge the interposers and related linkages to an in-operative position.

Before a punching action can occur, the selector cams of these devices must operate in opposition to the action of the springs and against the inertia of the linkages. This limits the speed of operation of this type of apparatus to a low range. The cost of manufacture is in addition consequently high inasmuch as the number of parts is many and the cam elements in particular present difficult machining problems.

Accordingly the principal object of the present invention is to provide a punch apparatus and selector means capable of very high speeds of operation.

Another object of this invention is to provide a high speed punch apparatus in which the number of parts making up the mechanism is reduced to a minimum thus reducing the cost of manufacture.

A further object of this invention is to provide a high speed tape punching apparatus having a plurality of solenoids which when energized by sequentially presented code signals from a plurality of separate signal channels permit a plurality of interposers to be pulled into punching position under the action of springs.

Still another object of this invention is to provide a tape punching apparatus in which the means for causing the punches to perforate the tape also operates to strip the punches from the tape after the punching operation has been accomplished.

A better understanding of the invention may be had from the following description of the apparatus as shown in the attached drawings wherein.

Figure 4:
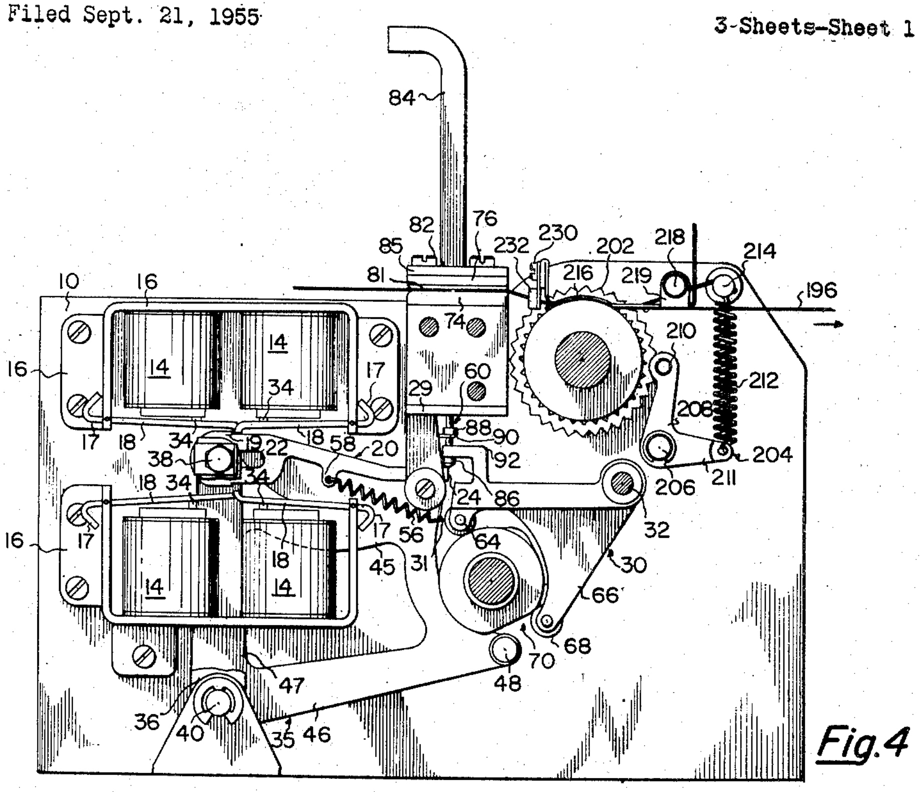
Fig. 4 is a vertical section with some parts in elevation showing the selecting means, punch operating mechanism, and tape feeding drum taken along the line 4—4 of Fig. 1.

In the mechanism described herein a series of eight interposers are disposed in a permutation of marking and spacing positions depending upon the signals received by the solenoids. When any of the solenoids are energized for a marking operation, co-operating interposers are disengaged and the interposers are pulled into marking position under the action of springs. An end of each interposer is interjected in the gap between the lower end of the punch and a rocking plate constituting a hammer. Subsequent rotation of cams on the drive shaft causes the hammer to be driven upwardly to thereby actuate the punches to perforate the tape. The punches are pulled back down through the tape by means of tongues on the hammer during the return stroke of the hammer. A bail driven by second cam means on the drive shaft at the conclusion of the cycle operates to pull all of the interposers back to their neutral or beginning positions.

Referring now to Figs. 1, 2, 4 and 5 there is shown an improved punching device which in this instance is adapted to perform a punching operation on paper tape and incorporates the applicant's differential gear stepping mechanism 100 described and claimed in the copending application Hoffman et al., S. N. 535,618 filed September 21, 1955, entitled "Differential Gear Stepping and Marking Device" and assigned to the same assignee as the present invention. The punching device is supported between a pair of parallel, vertically extending side plates 10 and 12 of the main frame. A plurality of pulse operated selector solenoids 14, eight in number in the present instance, for receiving code signals, are scured to brackets 16 which in turn are secured to side plate 10. Each solenoid 14 has a clapper finger 18 which is pivotally mounted upon its associated bracket 16 and has at its pivot end a portion 17 bent upon itself which can be adjusted to vary the open gap position of the solenoid. The free end of each solenoid clapper finger 18 cooperates with a shoulder portion 19 of an interposer 20. Springs 34 urge the clappers out of engagement with the solenoids when they are not energized. Each interposer 20 is an elongated member having an elongated eye portion 22 and a forward end 24 which is supported on an eccentric pin suspended by bracket 28 from the bottom punch plate 29, for its advancing and retractable movement. Details and a further use of the eccentric pin 26 will be later described.

Figures 3, 6, 7, 8, 9:
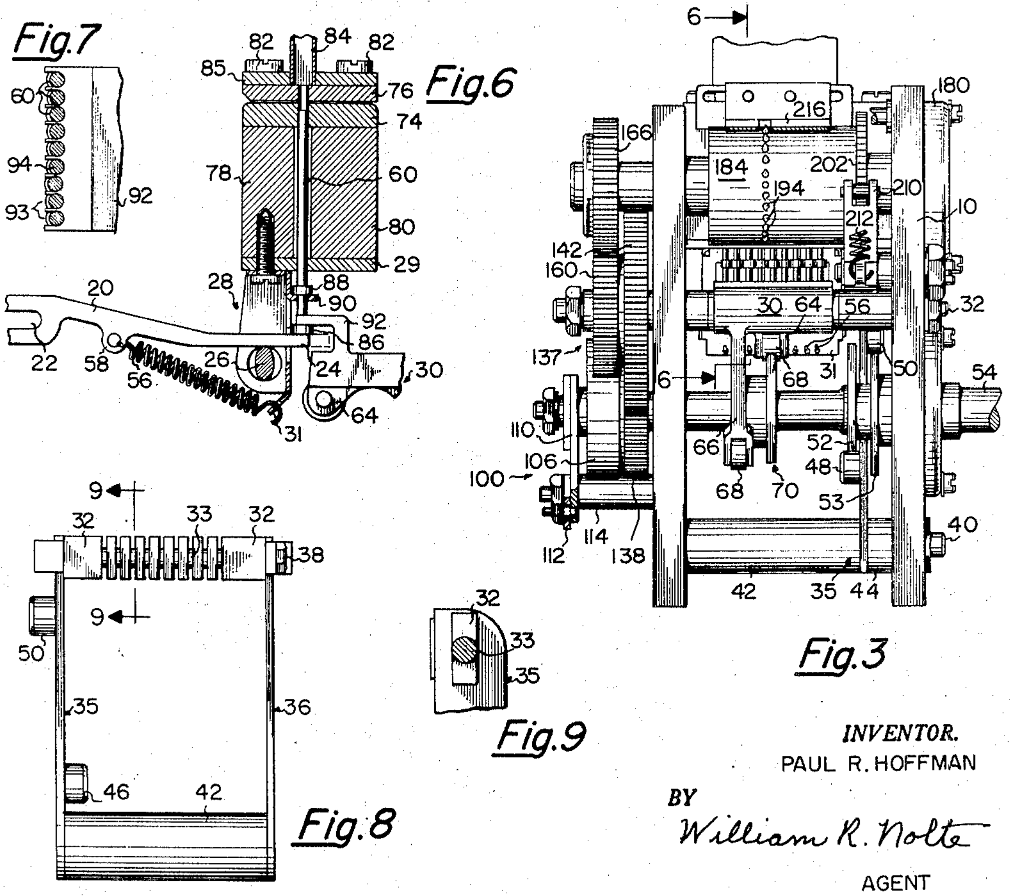
Fig. 3 is an end elevational view of the apparatus illustrated in Fig. 1.
Fig. 6 is an enlarged sectional view of the punch and operating hammer, taken along the line 6—6 of Fig. 3.
Fig. 7 is a sectional view through the punch pins and illustrating the comb portion of the punch hammer which engages the pins taken along the line 7—7 of Fig. 6.
Fig. 8 is a rear elevational view of the interposer bail and frame which restores the interposers upon the completion of each printing cycle.
Fig. 9 is a sectional view through the interposer bail taken along the line 9—9 of Fig. 8.

The elongated eye portion 22 of each interposer 20 is mounted in a different slot of a slotted guide bail 32, see Fig. 8. Guide bail 32 forms the upper horizontal member of an inverted generally U-shaped bail frame including side arms 35 and 36. The guide bail is secured to the mechanism by a bolt 38. Vertically below the guide bail is a cross shaft 40 upon which the lower ends of the side arms of the bail frame are pivoted. Spacer sleeve members 42 and 44 are carried by the shaft 40 to properly space the side arms of the bail frame. One of the side arms of the bail frame, such as 35, is provided with a journal extension which may be in plate form or exhibit an open frame formation as shown in Fig. 4. The extension comprises the top and bottom members 45 and 46 and a relatively vertically extending member 47. At the forward end of the extension are two cam following rollers 48 and 50 which are vertically spaced apart and preferably project from opposite sides of the plane of the extension as is evident in Figs. 3 and 8. The two rollers cooperatively engage a bail operating cam mounted on the main drive shaft 54. It willl be noted that the bail operating cam 51 has two cam contours 52 and 53 with which the rollers 48 and 50 engage, the cam contours being fixed to sleeve 55 which in turn is pin connected to shaft 54 as at 57. The cam contours 52 and 53 are disposed in such a manner that a positive actuating force is applied to the bail frame at all times, thus eliminating the need for extraneous biasing elements such as springs.

Figure 5:
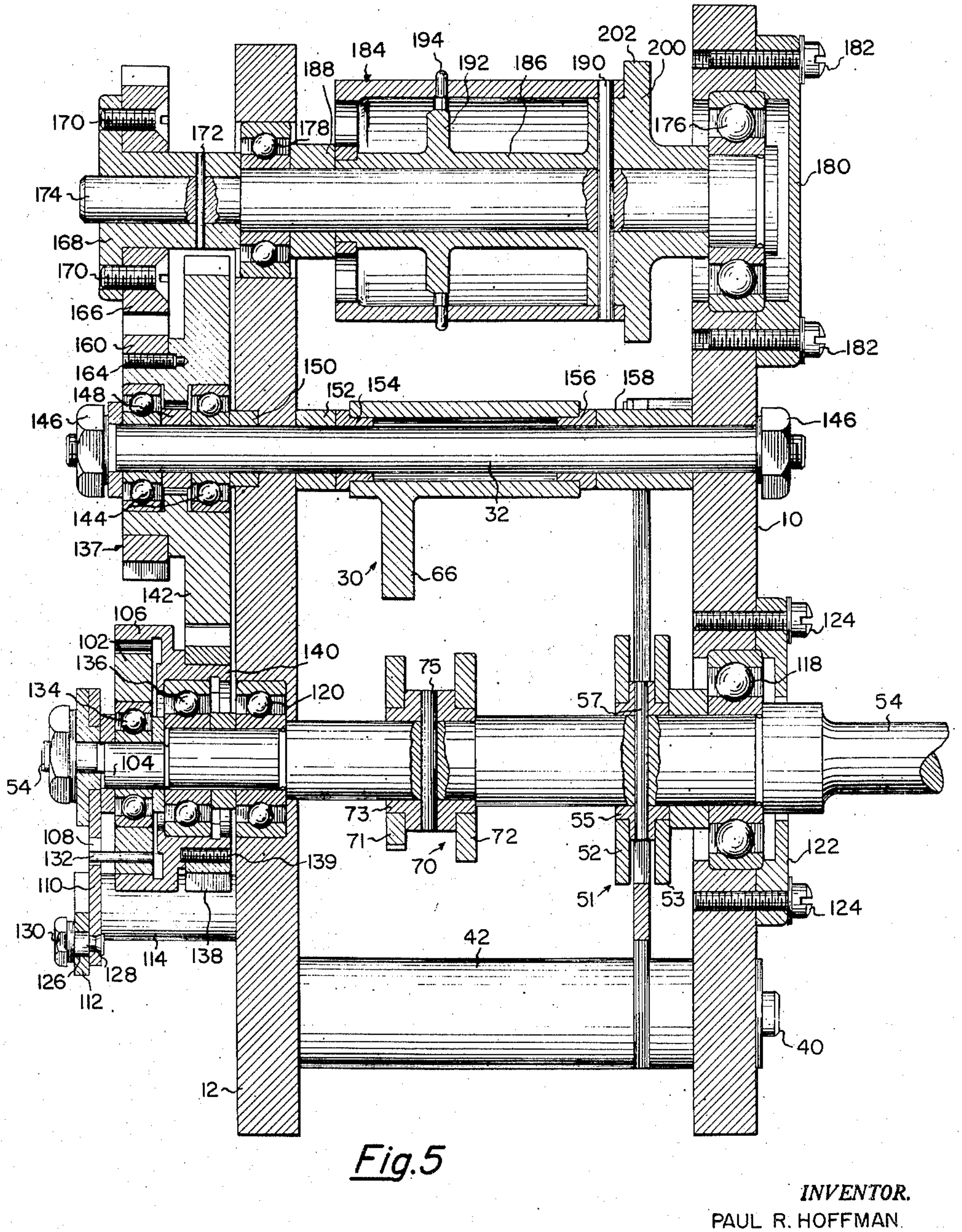
Fig. 5 is an enlarged detailed vertical sectional view of the wobble gear mechanism and associated driving elements for rotating the tape feeding drum, taken along the line 5—5 of Fig. 2.

When any one of the selector solenoids 14 is energized for a marking operation, its clapper finger 18 is attracted and disengages from the associated interposer 20. A spring 56 is associated with each interposer and is fastened at one of its ends to shoulder 58 of the interposer and at its other end to an inclined lip portion 31 of bracket 28. Each spring 56 tends to pull its interposer 20 forwardly into a punching position. In its punching position, each interposer 20 is adapted to cooperate, at its forward end, with the bottom end of an associated punch member 60, see Figs. 4 and 6. As will presently appear, the bottom end of the punch pin 60 which cooperates with the interposer 20 is such that the point of contact between the punch pin and the interposer is coincident with the vertical center line of the punch pin. Each interposer 20 is in addition, slidably received on the top portion of an actuating plate or hammer 30 pivotally carried on shaft 62. As shown in Figs. 4 and 5, the hammer 30 has integral therewith arm portions 64 and 66 each carrying a follower roller 68. Follower rollers 68 cooperate with the perforator operating cam 70 carried on main drive shaft 54. Cam 70 likewise has two cam contours 71 and 72 which are fixed to a sleeve 73 which in turn is pin connected to shaft 54 by pin 75. As previously mentioned in the case of the bail operating cam 52, the perforator operating cam has likewise two cam contours so as to provide a positive punch actuating force for a purpose which will presently appear, see Fig. 5.

When the forward end of each interposer 20 is in its marking position (see dotted line position, Fig. 6) it is projected over the hammer 30 and between the punch 60. When hammer 30 is caused to rise by rotation of the aforementioned cam 70, those punch members 60 whose interposers have been moved forwardly, are lifted vertically and are conformed to slide through guide plate 29. The guide plate 29 is the bottommost of three plates through which each punch member 60 travels, see Fig. 6. It has rather large clearance holes in it for rough guidance purposes for the pins. Traveling upwardly to the second guide plate 74, it is essential that the punch pins 60 be guided with the greatest degree of precision. The clearance between the holds in the second guidance plate and the punches is less than it is between the holes in the first guiding plate 29 and the top member or die plate 76. This is done to attain the most precise and ideal arrangement for the die member 76, thereby eliminating bowing or buckling thereof in use. Spacer blocks 78 and 80 are placed between plates 30 and 74 and are suitably secured therebetween. Die plate 76 is secured in proper alignment with guide plate 74 by corner bolts 82 but spaced therefrom by suitable spacer elements 81 to receive a tape of a predetermined thickness. These bolts in addition secure chute 84 and chute attaching plate 85 over the apertures of die plate 76 for removal of the chips or chads as the tape is perforated.

Considering the structure of punch pins 60 in greater detail it is observed that when the interposers 20 are in their non-punching positions, or moved back by the bail 32, each punch pin 60 is permitted to fall down only a predetermined distance, see Fig. 6. Each pin 60 carries two enlarged cylindrical collars 86 and 88. The topmost collar 88 is engaged by the horizontal lip portion 90 of bracket 28. The vertical distance between collars 86 and 88 and the position of the lip portion is selected so that the top of each interposer 20 in its forward or marking position clears the bottom collar 86 of its associated punch pin 60. Rising vertically and then extending horizontally from the top portion of the hammer 30 is a tongue portion 92. The tongue 92 has a plurality of notches 93, one for each punch pin 60, and serves as a comb member, see Fig. 7, which spans overlies the lower collars 86 of the pins. After a punching operation has occurred and on the return stroke of the hammer 30, the tongue 92 engages the lower cylindrical collar 86 of each punch pin 60 and pulls each pin back down through the tape. Tongue 92 also functions to maintain the upper working ends of the punches 60 normally below the upper surface of guide plate 74 and clear of the material to be perforated when the punches are not operated. Thus it is seen that tongue member 92 serves as a non-yielding punch stripping instrumentality.

When any interposer 20 is advanced to its forward or marking position and the hammer 30 is raised by rocking on its pivot, the interposer will rock about the pivot 33 that is provided by bail 32. In this relationship with interposer 20 moved under its respective punch, each interposer 20 serves as part of the drive mechanism for lifting the punch pin 60. Conversely when any interposer 20 is in its retracted or non-punch position, its corresponding punch pin will not be driven. In this situation the maximum rise of the hammer 30 is such that it cannot close the gap between itself and the lower end of the punch pin 60 with which the interposer is associated. Consequently, the punch pin corresponding to this interposer cannot be driven to punch the tape.

Figure 1:
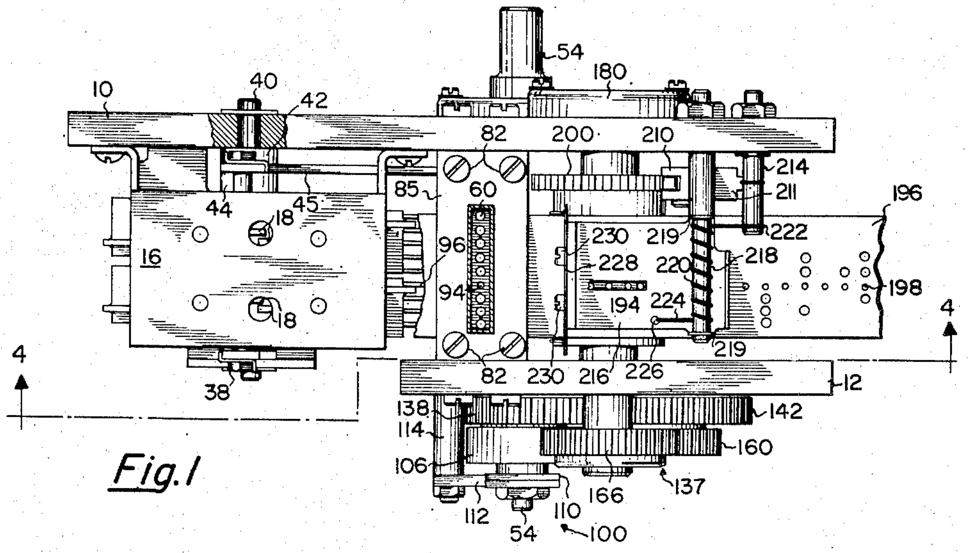
Fig. 1 is a top plan view of our invention.

As previously mentioned in addition to the eight code punch pins 60 there is a feed punch pin 94 and an associated interposer 96, see Fig. 1. There is no corresponding solenoid for this interposer 96, consequently interposer 96 is allowed to position itself in the space between the feed punch 94 and the hammer 30 during every revolution of the main drive shaft 54. As will later be described herein, the holes punched in the tape by punch pin 94 is engaged by a sprocket wheel for advancing the tape.

Figure 2:
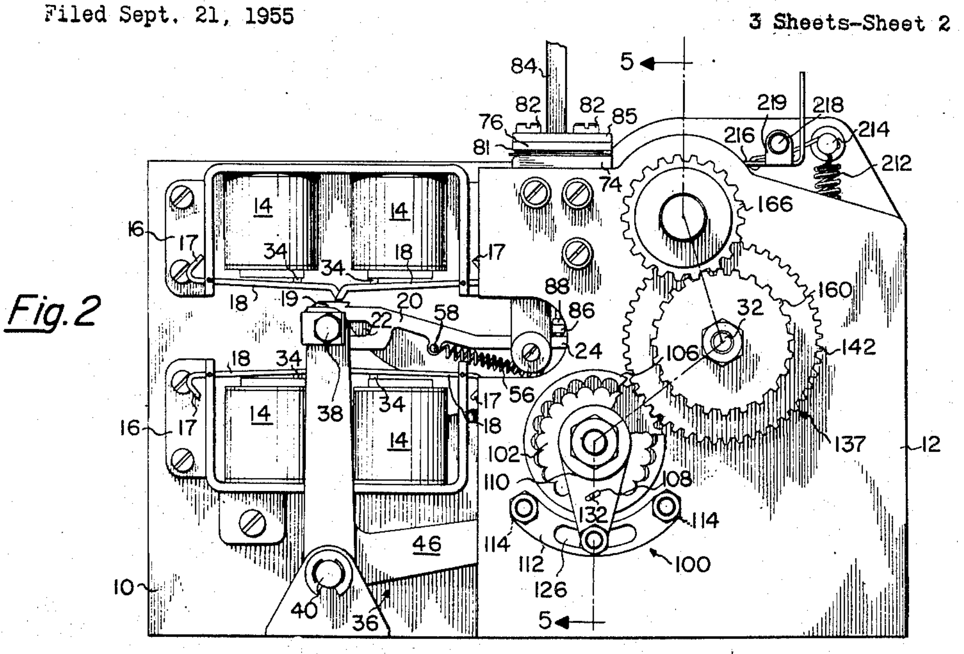
Fig. 2 is a side elevation view of the apparatus illustrated in Fig. 1 and showing the wobble gear mechanism.

The dwell or rest period of the tape is determined by the configuration of the dwell slot 108 located on the dwell plate 110 which will be more fully explained hereinafter in conjunction with the detailed description of the differential gear stepping mechanism 100 forming the subject matter of the above-mentioned co-pending application. The dwell period may be changed for various applications by replacing dwell plate 110 with a similar plate having a dwell slot of a different geometrical configuration. The dwell plate 110, in the embodiment of the invention shown in Figs. 2 and 5 is pivotally journalled on the input shaft 54 at one extremity and is adjustably fixed at its opposite extremity to an arcuately shaped slotted member 112. Slotted member 112 is rigidly secured to frame plate 12 by means of threaded end posts 114—114, and received into said plate at one end and secured at their outer ends by nuts 116. It will be noted that main drive shaft 54 is mounted so that it can be freely rotated by means of ball bearing assemblies 118 and 120 mounted in the side plates 10 and 12 respectively. Ball bearing assembly 118 is secured in place in plate 10 by means of bearing retainer 122 and bolts 124. An arcuate slot 126, which is centered on the axis of shaft 54, is provided in member 112 through which extends a pin 128 secured at one end to dwell plate 110 and receiving a nut 130 at its other end. The slot and pin fastening means permit the dwell period of the tape advance means to be changed by moving the plate so that the slot in the dwell plate 110 is adjusted to a different position as will be presently described. The slot and pin fastening means 105—132 restrain the inner gear from obtaining any net rotation. The inner rotor 102 of the stepping mechanism has affixed thereto a dwell pin 132 which is guided by an inclined slot 108 in the dwell plate 110. An inner gyrating gear 102, having externally extending teeth, is journalled for rotation on the eccentric portion 104 of the main drive shaft 54 by ball bearing assembly 134 so that its center is revolved about the axis of the shaft 54. Outer gear 106, having internally extending teeth, is likewise journalled for rotation on the main drive shaft 54 by ball bearing assembly 136. The difference in diameters of the inner and outer gears is precisely equal to the throw of the eccentric 104. The inner gear 102 being rotated out of center with respect to the outer gear 106 within said outer gear operates to bring the external teeth of the inner gear in successive mesh with the internal teeth of said outer gear successively about its tooth periphery. In so doing the outer gear 106 is caused to rotate. The manner by which the driving action of the outer gear may be caused to operate in a step-by-step driving action will be discussed in detail hereinafter.

The driving motion imparted to the outer gear 106 is transmitted to tape advance drum 184 by means of the gear train 137. A ring gear 136 is fixed by threaded pin 139 on a sleeve-like extension 140 of outer gear 136 for joint rotation therewith and meshes with idler gear 142. Idler gear 142 is mounted on the aforementioned hammer shaft 62 by means of a pair of ball bearing assemblies 144. Shaft 62 is secured to the frame plates 10 and 12 by means of nuts 146, and suitable spacer elements 148 between the two bearing assemblies. Additional spacer elements 150, 152, 154, 156, and 158 are mounted on the shaft between the frame plates. Ring gear 160 is likewise fixed upon a sleeve like portion 162 of idler gear 142, being secured thereto by threaded pin 164. Meshing with ring gear 160 is ring gear 166 which is fixedly secured to sleeve element 168 by screws 170. A pin 172 locks sleeve 168 to driven shaft 174 which is mounted for rotation in the frame plates 10 and 12 by means of ball bearing assemblies 176 and 178, respectively. Bearing retainer 180 and cooperating bolts 182 secure bearing assembly 176 within the frame plate 10.

A tape advance drum 184 is mounted on a sleeve member 186, which also functions as a spacer, and both the drum and sleeve are pinned to driven shaft 174 by pin 190. A spacer 188 may be interposed between the sleeve and bearing assembly 178. Flange portion 192 integral with and spaced from one end of sleeve member 186 carries a plurality of tape advance pins 194 spaced equally about the periphery of the flange. These pins project through apertures in the drum 186 beyond its cylindrical outer surface and serve to engage a tape 196 in its feed hole apertures 198 formed by the punch pin 94 as is evident in Fig. 1. An enlarged detent flange 200 is provided at one end of the sleeve member 186 and tape advance drum 184 and has a plurality of teeth 202 cut into its periphery equal in number to the number of pins 194 in the drum.

Referring to Fig. 4, a bell crank 204 is shown mounted on pivot 206 to frame plate 12 for movement thereabout. The vertical arm 208 of the bell crank carries a roller 210 which engages in the notches between the teeth 202 of the detent flange 200 coupled to the tape advance drum. The horizontal arm 211 of the bell crank is connected at its extremity to a spring 212 which is secured at its upper end to plate 10 by means of post 214. For every revolution of the main drive shaft 54, the tape advance drum through its pins 194 will move the tape 196, the distance between two adjacent pins on the drum. The bell crank actuated by spring 212 and in contact with the detent flange 200 on the tape advance drum, prevents the drum from backing up.

Mounted above and extending over the top of the tape advance drum 188 is a retaining plate 216 which is curved to conform to the curvature of the drum. The plate 216 is pivotally mounted to a post 218 which projects laterally from frame plate 10. For this purpose a pair of upstanding ears 219—219 integral with said retaining plate engage the post for said pivotal movement. A coil spring 220 encircles post 218, see Fig. 1, and has one end 222 thereof fixed to post 214 and its other end 224 fixed to plate 216 as at hole 226. The action of the spring is such as to urge plate 216 at all times into contact with paper tape to help insure that the tape meshes with the pins. The end of the plate remote from the pivot connection carries a guide member 228 which is secured to said plate by bolts 230. Member 228 has two downwardly fingers 232 at each end thereof which restrain the tape against lateral movement with respect to the tape advance drum 188.

A brief description of the operation of the invention follows:

The eight solenoids 14 are energized and de-energized in accordance with the code signals sequentially received thereby from a distant source (not shown). A clapper element 18, one associated with each solenoid, is accordingly pulled toward the solenoid when it is energized and allowed to be pushed away due to the urging of spring 56 when de-energized. If the solenoids 14 are energized, the interposers 20 will thereby be freed by the clappers 18 and will then be driven forward by springs 56 and positioned in the space between the hammer 30 and the punches 60. The punches 60 are assembled in a housing unit which is provided with a narrow slot to permit the tape 196 to be advanced therethrough. After the interposers 20 are positioned, the cam 70 attached to the main drive shaft 54 rocks the hammer 30 about its supporting shaft 32. Those punches 60 which cooperate with the feed interposers are thereby lifted from their normal position resting on the bar 90 and are caused to perforate the tape 196 to punch the desired information therein. It is observed that when moved under its respective punch 60 each interposer 20 serves as a part of the drive mechanism for lifting the punch.

If one or more of the punch solenoids 20 are not energized, their respective interposers will be held back by the associated clappers 18 when the reset frame 35 is pivoted forwardly due to the action of cam 51 on drive shaft 54. Each interposer when so retracted has clearance between its forward end and the hammer 30 and is therefore incapable of raising its respective punch 60. Upon conclusion of the punching operation the pivotally mounted reset frame 35 supporting guide bail 32 through its pin slot connection with each of the interposers 20 is caused to pivot backwardly to thereby restore the freed interposers to their retracted or beginning position.

The differential gear stepping mechanism 100 is combined in operation with the aforementioned punch actuating means such that the tape rests while the punching is being performed and is moved to a successive position during intermissions between punching operations. For this purpose the mechanism 100 embodies an eccentric 104 integral with and driven by drive shaft 54 upon which is journalled inner gear 102. The inner gear meshes with and drives outer gear 106 journaled on drive shaft 54. The inner gear has a lesser number of teeth than the outer gear and the difference in diameters of the two gears is precisely the throw of the eccentric 104. Rotation of the eccentric 104 causes the external teeth of the inner gear 102 to mesh with the internally extending teeth of the outer gear, thus forming a complete contact around the interior of the outer gear.

Plate 110 having slot 108 which receives pin 132 affixed to inner gear 102, controls the rotation of inner gear 102 about its axis, notwithstanding the gyratory motion of the inner gear about the axis of the outer gear. The slot 108 engaging the pin 132 is shaped over a portion of its length such that the inner gear 102 is restrained from rotating about its axis and thereby drives the outer gear 106 which operating through gear train 137, and tape advance drum 184 advances the paper tape of the punch. The remaining portion of the slot is so shaped to permit a limited angular motion of the inner gear 102 about its axis, during which interval no motion is imparted to the outer gear. The outer gear 106, now in a stopped condition, imparts no motion to gear train 137 and tape advance drum 184 so that the tape is therefore at rest for reception of a successive punching operation.

Having therefore described a preferred embodiment of the invention, setting forth its organization and its mode of operation, those features believed descriptive of the nature of the invention are defined with particularity in the appended claims.

What is claimed is:

1. In a machine for punching tape in accordance with code signals sequentially received by the machine from a plurality of separate signal channels, a plurality of solenoids each for receiving said code signals from a corresponding one of the channels, a plurality of punches for perforating a tape, a plurality of interposers cooperable with said punches, a plurality of members corresponding to said plurality of solenoids, said solenoids and said members cooperating to permute said members into a permutation of positions corresponding to the signals received by the solenoids, said members in one position thereof locking said interposers in a non-punching position and in a second position thereof releasing said interposers for movement into a marking position, means connected to said interposers and to an external support for resiliently urging said released interposers into an operative marking position for cooperation with ones of said plurality of punches corresponding to said released interposers to thereby transfer the permutation existing in said members to said interposers, means for operating through said released interposers for driving ones of said punches including a rocking plate mounted for pivotal motion between side plates of said apparatus, a drive shaft having first and second cam means thereon, complemental cam follower means extending from said rocking plate and engaging said first cam means, a tongue portion extending from said rocking plate in spaced parallel relation thereto, abutments on the lower extremities of said punches and in cooperative engagement with said tongue portion and with said interposers released into operative position, reset means pivotally mounted in said apparatus and including complemental cam follower means extending from said reset means and engaging said second cam means, a slotted cross member carried by said reset means and guiding said interposers for spaced reciprocal and pivotal motion, whereby partial rotation of said drive shaft will cause said released interposers and cooperating punches to perforate said tape, and subsequent rotation thereof to synchronously cause said tongue portion of said rocking plate to strip said punches from said tape while causing said reset means to restore said released interposers to a retracted non-punching position.

2. In a device for punching tape in accordance with code signals transmitted to said device, a plurality of solenoids for receiving said code signals, a plurality of pivotally mounted punch interposers, a plurality of punches cooperable with said punch interposers to perforate a tape in accordance with code signals received by said solenoids, means in one position thereof for holding the interposers in a retracted non-punching position and in a second position thereof for releasing ones of said punch interposers from said retracted non-punching position in accordance with said code signals received by said solenoids, means for moving said released interposers into punch actuating position for cooperation with ones of said punches corresponding to said released interposers, and means for actuating said released interposers whereby said punches cooperating with said ones of said punch interposers are caused to perforate said tape in accordance with said signals received by said solenoids, a pivotally mounted reset frame supporting said interposers, a guide bail carried by said frame and having a pin slot connection with each of said interposers, whereby said interposers are guided in parallel spaced relation and are permitted rectilinear and pivotal motion therebetween, said actuating means functioning simultaneously with said frame to pivot said frame to return each of said released interposers to its retracted non-punching position.

3. In an apparatus for punching a tape, a plurality of punch interposers each having an elongated eye portion and mounted for movement in a common plane and for rocking movement in a plane perpendicular to said common plane, banks of electro-magnetic devices disposed on top and bottom sides of said common plane, a plurality of punches cooperable with said punch interposers to perforate a tape in accordance with code signals received by said devices, means movably associated with each of said devices and operable in response to the energization of the devices to move to one position to hold the interposer associated therewith in an inactive position in accordance with certain code signals received by said devices and in another position freeing its associated interposer for movement, means for moving said freed punch interposers into punch actuating position, means for actuating the freed interposers of said plurality of punch interposers whereby said punches cooperating with the freed punch interposers are caused to perforate said tape in accordance with signals received by said electro-magnetic devices, a pivotally mounted reset frame including a guide bail engaging the elongated eye portions of said interposers and means functioning in timed relation to the actuating means to pivot the reset frame such that the bail member and its interconnected interposers are caused to be restored to said inactive position.

4. In an apparatus for marking a tape in accordance with code signals received by the apparatus, a plurality of solenoids for receiving the code signals, a plurality of punch interposers normally positioned in a first position and adapted to be permutably positioned between said first position and a second position in accordance with said signals, means controlled by said solenoids for tending to prevent movement of the punch interposers from their first positions, means for moving said punch interposers to said second position to form permutations of positions of said plurality of punch interposers in accordance with the signals received by said solenoids, a plurality of punches cooperable with said punch interposers for perforating the tape in accordance with said signals, means for actuating said punches whereby ones of said punches corresponding to said ones of said punch interposers moved to said second position are caused to perforate said tape, means for adjusting said interposers comprising a cam shaft, said shaft being adapted to be rotated whereby said interposers are positioned for interjection between said punch actuating means and said punches.

5. In a tape marking apparatus the combination including a plurality of solenoids for receiving code signals, a plurality of punches movable between punch and non-punch positions, a pivotally mounted rocking plate, a plurality of interposers, rotatable cam means for driving said rocking plate through oscillatory movements, said rocking plate being directly coupled to said cam means to positively drive said rocking plate throughout the entire revolution of said cam means, a plurality of latching armatures, said solenoids and said latching armatures cooperating to permute said armatures into a permutation of positions corresponding to the signals received by said solenoids, said latching armatures in one position thereof locking said interposers and in a second position thereof releasing said interposers, and means for moving said interposers when released into a position cooperating with ones of said punches and with said rocking plate whereby pivotal movement of said rocking plate in one direction moves said last named punches to mark said tape.

6. In the tape marking apparatus as defined in claim 5 wherein said rocking plate includes means to move said ones of said punches to their non-punch positions when said rocking plate is pivotally moved in an opposite direction.

7. In the tape marking apparatus as defined in claim 5 wherein said rocking plate includes a bifurcated end comprising first and second arm portions, said first arm portion thereof engaging said moved interposers to drive said punches to their punch positions, said second arm portion engaging only said moved punches to strip said punches from said tape and to restore the same to their non-punching positions upon opposite pivotal motion of said rocking plate.

8. In a tape marking apparatus as defined in claim 5 including pivotally mounted bail means connected to said plurality of interposers, said bail means being directly coupled to said cam means for synchronous movement with respect to said rocking plate for restoring said moved interposers to their locked position.

9. In a marking apparatus, means controlled by code signals, a plurality of marking elements mounted for movement between mark and space positions, drive means mounted in spaced relation with respect to said elements, a plurality of interposers shiftable between operative and inoperative positions, latch means mounted in one position thereof to lock said interposers in an inoperative position and movable to a second position by said signal controlled means to release said interposers for movement, and means connected to said interposers for moving said released interposers into operative position into the space between said marking elements and drive means, whereby said drive means upon movement thereof operates through said moved interposers to transmit motion to said marking elements to mark.

10. In an apparatus for perforating a tape, means for receiving code signals, a punch pin mounted for movement between mark and space positions, drive means below said punch pin, an interposer shiftable between operative and inoperative positions, pivotally mounted latch means in one position engaging said interposer to lock said interposer in an inoperative position and movable to a second position by said code signal receiving means to release said interposer for movement, means connected to said interposer for moving said released interposer into an operative position below said punch and above said drive means, whereby said drive means operates through said moved interposer to cause said punch pin to perforate said tape.

References Cited in the file of this patent

UNITED STATES PATENTS

| | | |
|---|---|---|
| 2,183,820 | Nelson | Dec. 19, 1939 |
| 2,436,126 | Tholsrup | Feb. 17, 1948 |
| 2,451,752 | Lake | Oct. 19, 1948 |
| 2,540,027 | Dodge | Jan. 30, 1951 |
| 2,620,877 | Furman | Dec. 9, 1952 |
| 2,627,924 | Malmros | Feb. 10, 1953 |
| 2,647,581 | Gardinor | Aug. 4, 1953 |
| 2,648,385 | DeBoo | Aug. 11, 1953 |